United States Patent
Maher et al.

(10) Patent No.: US 6,298,058 B1
(45) Date of Patent: Oct. 2, 2001

(54) METHODS FOR IMPLEMENTING A TALKGROUP CALL WITH COMPETING SOURCES IN A MULTICAST IP NETWORK

(75) Inventors: John W. Maher, Woodstock; Daniel J. McDonald, Cary; Michael Korus, Hoffman Estates, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/459,288

(22) Filed: Dec. 17, 1999

(51) Int. Cl.[7] .............................. H04L 12/28; H04L 12/56
(52) U.S. Cl. .............................. 370/390; 455/518
(58) Field of Search .............................. 370/390, 274, 370/277, 279, 293, 299, 312, 310, 313, 327, 328, 329, 341, 349, 389, 432; 455/416, 422, 428, 500, 503, 518, 519, 524, 526

(56) References Cited

U.S. PATENT DOCUMENTS

| | | | |
|---|---|---|---|
| 5,369,783 | * 11/1994 | Childress et al. | 455/17 |
| 5,481,545 | * 1/1996 | Maedjaja et al. | 370/327 |
| 5,548,631 | * 8/1996 | Krebs et al. | 455/426 |
| 5,625,623 | * 4/1997 | Kent et al. | 370/280 |
| 5,761,193 | 6/1998 | Derango et al. | |
| 5,805,976 | * 9/1998 | Frichtel et al. | 455/8 |
| 5,910,946 | 6/1999 | Csapo. | |

* cited by examiner

Primary Examiner—Dang Ton
Assistant Examiner—Phirin Sam
(74) Attorney, Agent, or Firm—Steven R. Santema

(57) ABSTRACT

Methods for implementing talkgroup calls in an IP multicast network among competing sources, including console dispatch takeover of an active call from a subscriber, subscriber unit attempted takeover of an active call from a console, and operation of communication devices in different receive modes. In the takeover or attempted takeover situation, the methods allow for a first group of participating devices (e.g., consoles) to hear both competing sources, and for a second group of participating devices (e.g., base site repeaters) to hear only the higher priority source. The methods allow for different dekeying sequences between the competing sources after the takeover or attempted takeover, as appropriate, such that participating devices will hear the remaining source. Where multiple payloads are addressed to the same multicast group address, an exclusive receive mode enables a group of communication devices (e.g., base site repeaters) having joined the address to exclusively receive a selected one of the payloads.

24 Claims, 10 Drawing Sheets

METHODS FOR IMPLEMENTING A TALKGROUP CALL WITH COMPETING SOURCES IN A MULTICAST IP NETWORK

FIELD OF THE INVENTION

This invention relates generally to communication systems, and particularly communication systems incorporating multicast internet protocol (IP) addressing.

BACKGROUND OF THE INVENTION

Communication systems typically include a plurality of communication units, such as mobile or portable radio units and dispatch consoles that are located at multiple sites. The various sites usually include base site repeaters ("repeaters") for transceiving information such as control, voice, data and network management traffic between the communication units and each other. The communication units are often logically divided into various subgroups, known as talkgroups, which can be made up of communication units at different sites desiring to participate in a group or dispatch call. A dispatch call is one in which members of a particular talkgroup can communication with each other via communication links established between multiple endpoints, such as voice repeaters and dispatch console positions. Dispatch calls are often prioritized according to the source of the communication. For example, a message from a console operator typically receives a higher priority than one from a mobile or portable radio unit.

Next generation radio systems propose to employ multicast addressing protocols such as multicast Internet Protocol (IP) for providing group or dispatch call services. Examples include U.S. patent application Ser. No. 09/283,121, titled "Wireless Communication System Incorporating Multicast Addressing and Method For Use" and U.S. patent application Ser. No. 09/464,269, titled "Methods for Implementing a Talk group Call in a Multicast IP Network," each assigned to Motorola, Inc. and incorporated herein by reference in their entirety. Generally, IP multicasting protocols provide one-to-many or many-to-many communications capability in a connectionless packet network. The network defines a spanning tree of router interfaces and necessary routes between those interfaces to provide multicast distribution of data with a minimum amount of data replication. Moreover, with multicast routing protocols, there is no need for dedicated bandwidth to each endpoint, thus dispatch service can be provided relatively more efficiently and less costly than in traditional circuit-switched networks. However, no solutions are currently known to exist for voice priority among competing sources in an IP multicast network.

Accordingly, there is a need for a method of implementing talkgroup calls in an IP multicast network among competing sources that may have different transmit priorities. The transmit priorities may relate to the priority of the sources per se (e.g., dispatch console having a higher priority than a subscriber unit), the priority of different units of the same type (e.g., police radio having a higher priority than a dogcatcher radio) or the priority of the messages from the respective sources (e.g., emergency calls having a higher priority than status updates). To that end, there is a need for a system and method that allows a source having a higher transmit priority (e.g., dispatch console) to "takeover" an active call from a source having a lower transmit priority (e.g., subscriber radio unit). Preferably, a first group of communication devices in the talkgroup (e.g., monitoring console positions) will be able to hear both the high transmit priority and low transmit priority sources, while a second group of communication devices in the talkgroup (e.g., subscriber units) should hear the high transmit priority source instead of the low transmit priority source after the takeover.

Conversely, there is a need for accommodating a request to transmit ("attempted takeover") from a lower transmit priority source during an active call from a higher transmit priority source. In this scenario, a first group of communication devices in the talkgroup (e.g., consoles) will preferably be able to hear both the high transmit priority and low transmit priority sources, while a second group of communication devices in the talkgroup (e.g., subscriber units) should continue hearing the high transmit priority source and not hear the lower transmit priority source during the attempted takeover. In either the "takeover" or "attempted takeover" situation, there is a need for accommodating cases when the lower transmit priority source dekeys before the higher transmit priority source and when the higher transmit priority source dekeys before the lower transmit priority source. The present invention is directed to addressing these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
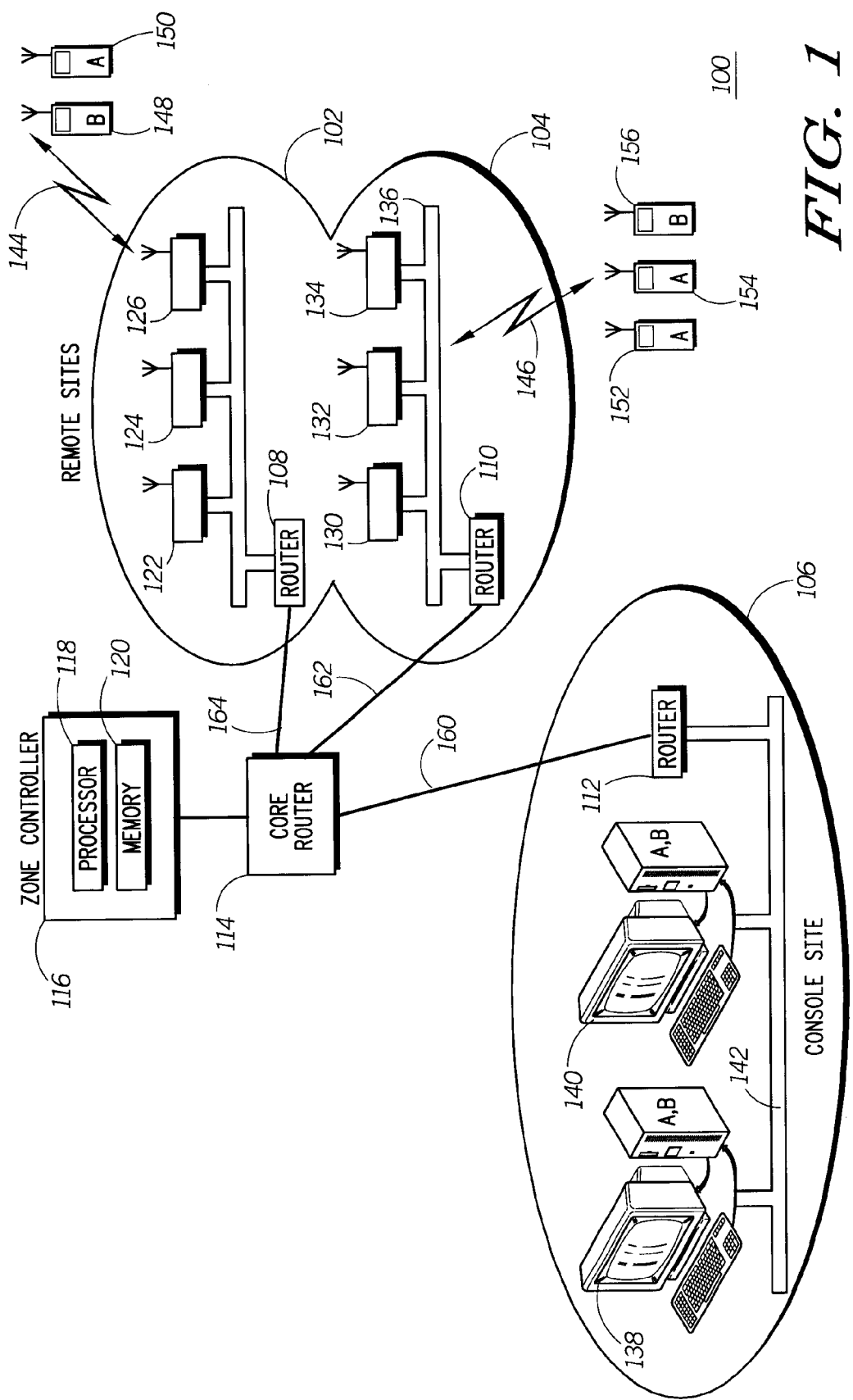
FIG. 1 is a block diagram of a communication system Using IP multicast addressing according to the invention.

The following describes a system for implementing talkgroup calls among competing sources, and for using an IP multicast network to distribute payload from one or more of the sources to various communication devices participating in a talkgroup call.

In one embodiment of the present invention, there is provided a method for a second communication device to "takeover" an active call sourced from a first communication device. The active call defines a first payload transmitted from the first communication device to one or more network devices and addressed to a first payload multicast group address. Various participating communication devices are initially joined the first payload multicast group address to receive the first payload from the one or more network devices. The method comprises a controller receiving, from the second communication device, a request to transmit during the active talkgroup call. The controller identifies a second payload multicast group address to be used for distributing a payload ("second payload") from the second communication device during the active talkgroup call. A first group of participating devices leaves the first payload multicast group address to stop receiving the first payload. The first group, and a second group of the participating devices join the second payload multicast group address to receive the second payload, via one or more network devices.

The method allows for different dekeying sequences among the first and second communication devices after the takeover. Where the first communication device dekeys before the second communication device, the controller determines that the first communication device has dekeyed and then sends messages to the second group of communication devices indicating that the first communication device has dekeyed. The second group of communication devices leave the first payload multicast group address. The first and second group of communication devices remain joined to the second payload multicast group address to receive the second payload from the second communication device. Where the second communication device dekeys before the first communication device, the controller determines that the second communication device has dekeyed and sends messages to the first and second group of communication devices indicating that the second communication device has dekeyed. The first and second groups of communication devices leave the second payload multicast group address. The first group of communication devices rejoins the first payload multicast group address, and the second group of communication devices remains joined to the first payload multicast group address to receive the first payload from the first communication device.

In another embodiment of the present invention, there is provided a method for denying takeover from a second communication device of an active call sourced from a first communication device. The active call defines a first payload transmitted from the first communication device to one or more network devices and addressed to a first payload multicast group address. A first and second group of participating devices are initially joined to the first payload multicast group address to receive the first payload, via one or more network devices. The method comprises a controller receiving, from the second communication device, a request to transmit during the active talkgroup call. The controller identifies a second payload multicast group address to be used for distributing a payload ("second payload") from the second communication device during the active talkgroup call. A second group of participating devices joins the second payload multicast group address to receive the second payload. The first and second group of participating devices remain joined to the first payload multicast group address to receive the first payload.

The method allows for different dekeying sequences among the first and second communication devices after the denied takeover. Where the first communication device dekeys before the second communication device, the controller determines that the first communication device has dekeyed and sends messages to the first and second group of communication devices indicating that the first communication device has dekeyed. The first and second groups of communication devices leave the first payload multicast group address. The first group of communication devices joins the second payload multicast group address, and the second group of communication devices remains joined to the second payload multicast group address to receive the second payload from the second communication device. Where the second communication device dekeys before the first communication device, the controller determines that the second communication device has dekeyed and then sends messages to the second group of communication devices indicating that the second communication device has dekeyed. The second group of communication devices leave the second payload multicast group address. The first and second group of communication devices remain joined to the first payload multicast group address to receive the first payload from the first communication device.

In still another embodiment of the present invention, there is provided a method comprising sending, from a first and second communication device, respective first and second payloads to one or more network devices, the first and second payloads being addressed to a first payload multicast group address. A controller assigns zero or more of the communication devices having joined the first payload multicast group address to operate in an exclusive receive mode. Optionally, the controller may determine which one of the first and second payloads is to be received in the exclusive receive mode. Those devices, if any, that are assigned to operate in the exclusive receive mode send messages to one or more network devices requesting operation in the exclusive receive mode. The network devices send only a selected one of the first and second payloads to the devices having requested operation in the exclusive receive mode.

Turning now to the drawings and referring initially to FIG. 1, there is shown an IP multicast communication system (or "network") 100 comprising a plurality of sites 102, 104, 106 that are coupled, via respective routers 108, 110, 112 to a core router 114. The routers 108–114 may comprise, for example, 3Com "NetBuilder" series routers. The core router 114 is coupled to a zone controller 116 having a processor 118 (such as a microprocessor, microcontroller, digital signal processor or combination of such devices) and a memory 120 (such as volatile or non-volatile digital storage devices or combination of such devices). In one embodiment of the present invention, the zone controller 116 manages and assigns IP multicast addresses for payload (voice, data, video, etc.) and control messages between and among the various sites 102, 104, 106.

As depicted in FIG. 1, site 102 includes a plurality of repeaters 129, 124, 126 that are coupled, via Ethernet 128 to an associated router 108. Similarly, site 104 includes a plurality of repeaters 130, 132, 134 that are coupled, via Ethernet 136 to router 110. Generally, the repeaters at the various sites 102, 104 communicate, via wireless communication resources 144, 146 with a plurality of subscriber units 148–156, which may comprise mobile or portable wireless radio units. Suitable wireless communication resources 144, 146 are multiple RF (radio frequency) channels such as pairs of frequency carriers, time division multiple access (TDMA) slots, code division multiple access (CDMA) channels, or any other RF transmission media. In the case where the communication resources comprise RF channels, it is common to assign separate channels and/or separate repeaters for different types of communication traffic. Thus, the repeaters at the various sites 102, 104 may comprise control channel repeaters, voice channel repeaters and/or link repeaters. For convenience, the term "repeater site" or simply "base site" will be used hereinafter instead of referring specifically to the repeater(s) at a particular site. In contrast, site 106 includes a plurality of dispatch consoles 138, 140 that are coupled via Ethernet 142 to router 112 and defines a "console" site. Consoles 138, 140 may comprise wireless or wireline consoles. Although not shown in FIG. 1, it will be appreciated that a single site may include both repeaters and console positions.

Practitioners skilled in the art will appreciate that the network 100 may include various other communication devices not shown in FIG. 1. For example, the network 100 may include wireline communication device(s), site controller(s), comparator(s), telephone interconnect device (s), internet protocol telephony device(s), call logger(s), scanner(s) and gateway(s). Generally, such communication devices may be either sources or recipients of payload and/or control messages routed through the network 100. These devices are described briefly below.

A site controller is a device having a processor (such as a microprocessor, microcontroller, digital signal processor or combination of such devices) and a memory (such as volatile or non-volatile digital storage devices or combination of such devices), that may be located at a particular site. A site controller may be used to control the communication of payload and/or control messages between repeater(s) at a particular site. A site controller may also control communications between the repeater(s) and their associated router. In one embodiment, for example, a site controller sends IGMP Leave and Join messages to a router associated with a particular site to enable the repeater(s) at that site to receive payload and/or control messages addressed to particular multicast group address(es).

A comparator (or "voter") is a device, usually connected by wireline to various receivers (e.g., different repeaters) receiving different instance(s) of a particular message or signal (e.g., from a subscriber radio unit). The comparator receives and compares among the different instances of the signal that may be received by the different receivers, and produces an output message that is comprised of either an entire message from one of the receivers or a composite message comprised of segments of the message received from one or more of the receivers. Each message may be comprised of a plurality of message frames.

A scanner is a receiver that is adapted to monitor message transmissions from communication devices such as mobile or portable wireless radio units, consoles, repeaters, and the like. In one mode of operation, for example, a scanner scans the radio spectrum for the purpose of finding and, optionally, locking on to carrier frequencies containing message transmissions. Scanners are sometimes used by parties that are not intended recipients of the message transmissions and thus may or may not be members of a particular talkgroup for which the message transmissions are intended.

A telephone interconnect device is a network-based device that provides voice transcoding services between mobile and land line subscribers when invoking full duplex telephone calls between those two subscribers. A transcoding service is required, for example, when a mobile subscriber using ACELP vocoding requests a call to a subscriber in the public switched telephone network (PSTN) using 64-kilobit per second PCM vocoding.

An internet protocol telephony device comprises a telephone that transports voice and/or control messages over an LAN to a telephony gateway box, which interfaces multiple (LAN based) phones and converts the IP control and audio packets back into the format of the local PSTN. More generally, a gateway device is one that provides voice and control translation services between two dissimilar communication systems. For example, a gateway device would be required if an APCO system were to be connected to a GSM system. Other services such as feature translation, authentication, authorization and encryption could also be provided by a gateway device.

A call logger is a networked based device that records packetized voice talkgroup and private calls in a public safety system. A call logger could also record data calls. A call logger device typically stores the voice payload in its native format (i.e. vocoded audio). When it is desirable to playback the voice conversation at a later time, the call logger retrieves and decodes all packets which bound the call in question.

As shown in FIG. 1, the plurality of subscriber units 148–156 are arranged into talk groups having corresponding talk group identifications as known in the art. Any number of talk groups having corresponding talk group identifications can be established within the system 100. In FIG. 1, two separate talk groups are shown, identified by labels "A" and "B." Talk group "A" at least includes the subscriber units 150, 152, 154 and talk group "B" at least includes the subscriber units 148, 156. Console positions 138, 140 can affiliate with either, or both talkgroups "A" and "B" and, accordingly, may be considered members of both talk groups "A" and "B."

According to a preferred embodiment of the present invention, the zone controller 116 dynamically assigns and manages respective payload and control IP multicast addresses for payload (voice, data, video, etc.) and control messages between and among participating talkgroup members at the various sites 102, 104, 106. That is, multicast group addresses for particular talkgroups are not fixed (and therefore, are not stored in memory of devices distributed throughout the network) but rather are identified and assigned by the zone controller 116 on a call-by-call basis. As such, a particular multicast group address is only temporarily assigned to any one call and can be reassigned to different calls as needed or desired. Dynamic, rather than static assignment of addresses is advantageous in terms of efficient use of resources in the network. One reason is because, in the static example, various multicast addresses (perhaps hundreds) associated with all of the different talkgroups in the network must be stored in the memory of various network devices, even though less than all of the talkgroups are generally active at any particular time. Moreover, even among talkgroups that are active, those talkgroups may not require use of all the network devices, for example, if they do not have members at each site. Thus, dynamic assignment of addresses is preferred. Alternatively, however, static assignment of addresses can be done.

Multipoint routes pertaining to the IP multicast addresses used in the present invention are maintained by the routers 108–114 forming the network 100. IP Multicast is based on the well-known Internet Group Management Protocol (IGMP) which allows a multicast router to track the existence of multicast group members on local networks coupled to that router. Additionally, multicast routers use the information provided by IGMP in conjunction with a multicast routing protocol to support forwarding of data across a network of routers. Given the nature of wireless communication systems, sparse mode protocols such as the Core Based Tree (CBT) protocol and the Protocol Independent Multicast—Sparse Mode (PIM-SM) protocol are preferred multicast routing protocols for use in the present invention. However, it is anticipated that dense mode protocols such as the Distance Vector Multicast Routing Protocol (DVMRP), the Multicast Open Shortest Path First (MOSPF) protocol, the Protocol Independent Multicast—Dense Mode (PIM-DM) protocol or other protocols that may be devised in the future may also be used to implement the present invention. A common feature of these multicast routing protocols is that each establishes a "spanning tree" which, for a given multicast group, defines all of the router interfaces which contain group members and the necessary routes between these interfaces to provide the multicast distribution with a minimum amount of data replication.

Figure 2A:
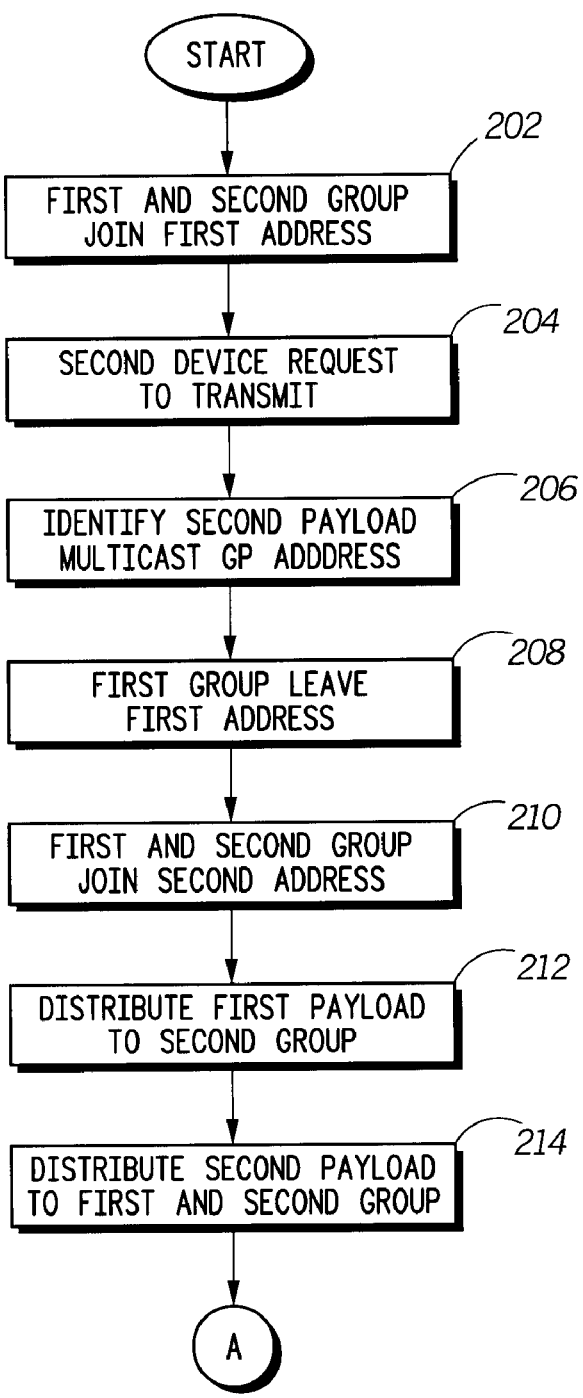
FIG. 2A is a flowchart illustrating a competing communication device takeover of an active call according to one embodiment of the invention.

Referring now to FIG. 2A, there is shown a method for a competing communication device to "takeover" an active talkgroup call. The steps of FIG. 2A are implemented, where applicable, using stored software routines within the communication devices, zone controller 116 or routers forming the network 100. At step 202, the active call is initiated by a communication device ("first device") transmitting a payload ("first payload") to one or more network devices (e.g., routers). For example, step 202 may be accomplished using methods described and claimed in U.S. patent application Ser. No. 09/464,269, assigned to Motorola, Inc. and incorporated herein by reference in its entirety. The first payload is addressed to a first payload multicast group address. The first communication device may comprise, for example, a portable wireless communication device, mobile wireless communication device, wireline communication device, wireless console, wireline console, repeater, site controller, comparator, telephone interconnect device or internet protocol telephony device. The payload may comprise, for example, an audio payload, data payload, video payload or multimedia payload. Various participating devices having affiliated with the talkgroup and joined the first multicast group address are eligible to receive the first payload from the one or more network devices. The participating devices may comprise, for example, subscriber unit(s), such as a wireless mobile or portable radios, wireline communication device(s), console(s) (wireless or wireline), repeater(s)/base station(s), site controller(s), comparator(s)/voter(s), scanner (s), site controller(s), telephone interconnect device(s) or internet protocol telephony device(s).

In one embodiment of the present invention, the participating devices include two groups of communication devices (a "first group" and "second group") having joined the first payload multicast group address at step 202. The participating devices may be divided, for example, in terms of the types of devices (e.g., consoles vs. repeaters) and/or the communication capability of the devices (e.g., full duplex vs. half duplex devices). Alternatively, the two groups may be divided arbitrarily or otherwise on some basis other than the type of device(s) or communication capability of the device(s). The first and second groups may be identical or different, and may consist of virtually any number and/or type of devices. At a minimum, either or both of the group(s) may comprise a null set (e.g., no communication devices) and at a maximum, either or both of the group(s) may comprise the entire set of communication devices participating in the active call.

At step 204, a competing communication device ("second device") requests to transmit during the active call. The second communication device may comprise, for example, a portable wireless communication device, mobile wireless communication device, wireline communication device, wireless console, wireline console, repeater, site controller, comparator, telephone interconnect device or internet protocol telephony device. Generally, the second communication device should have a higher transmit priority than the first communication device in order to takeover the talkgroup call. For example, a console normally has a higher transmit priority than a subscriber unit. Thus, in one embodiment of the present invention, the steps of FIG. 2 may be executed for a console to "takeover" an active call that is being sourced from the subscriber radio.

Figure 3:
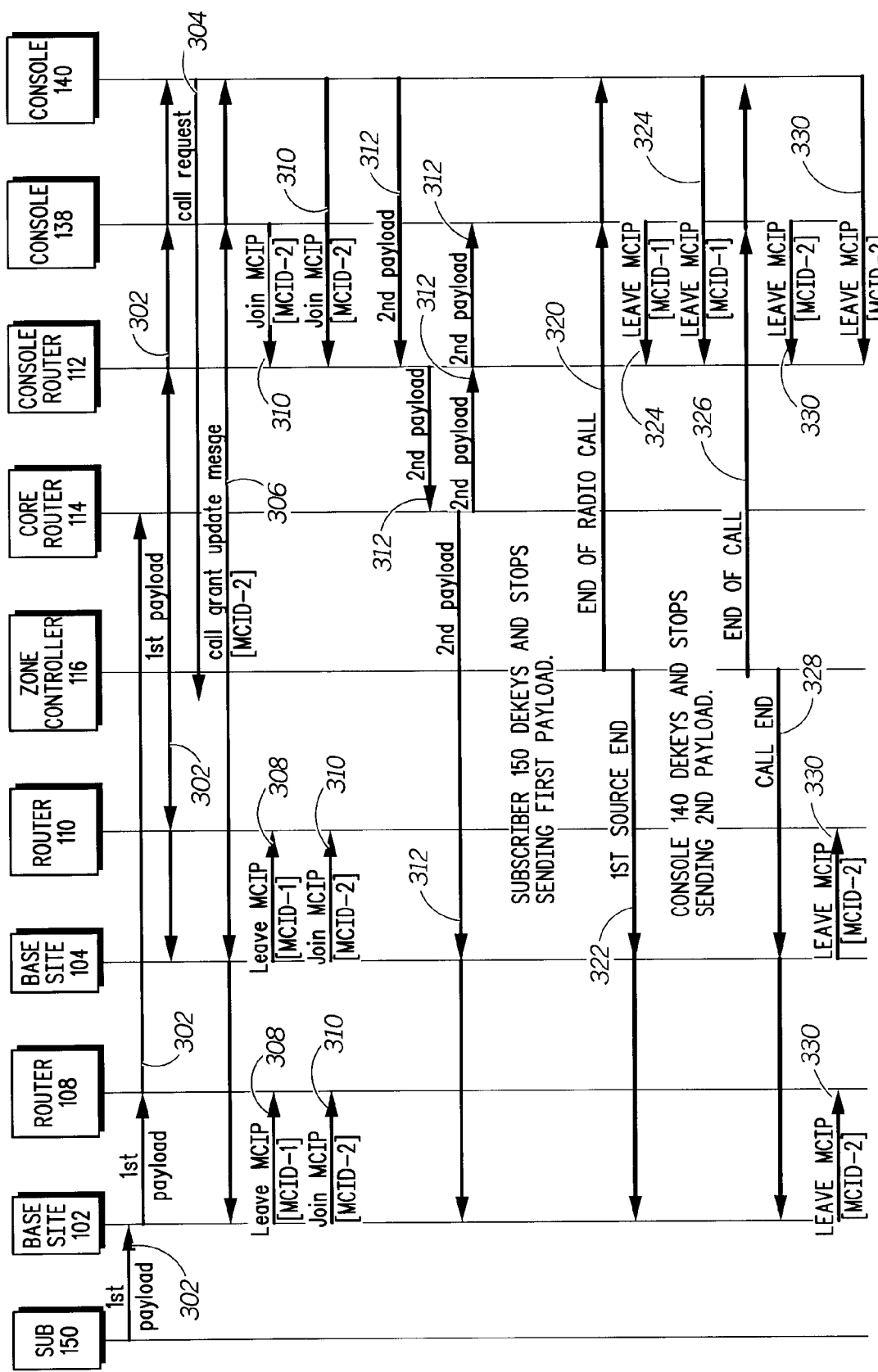
FIG. 3 is a message sequence chart associated with a console takeover of an active call sourced by a subscriber unit, when the subscriber dekeys before the console, according to one embodiment of the invention.
Figure 4:
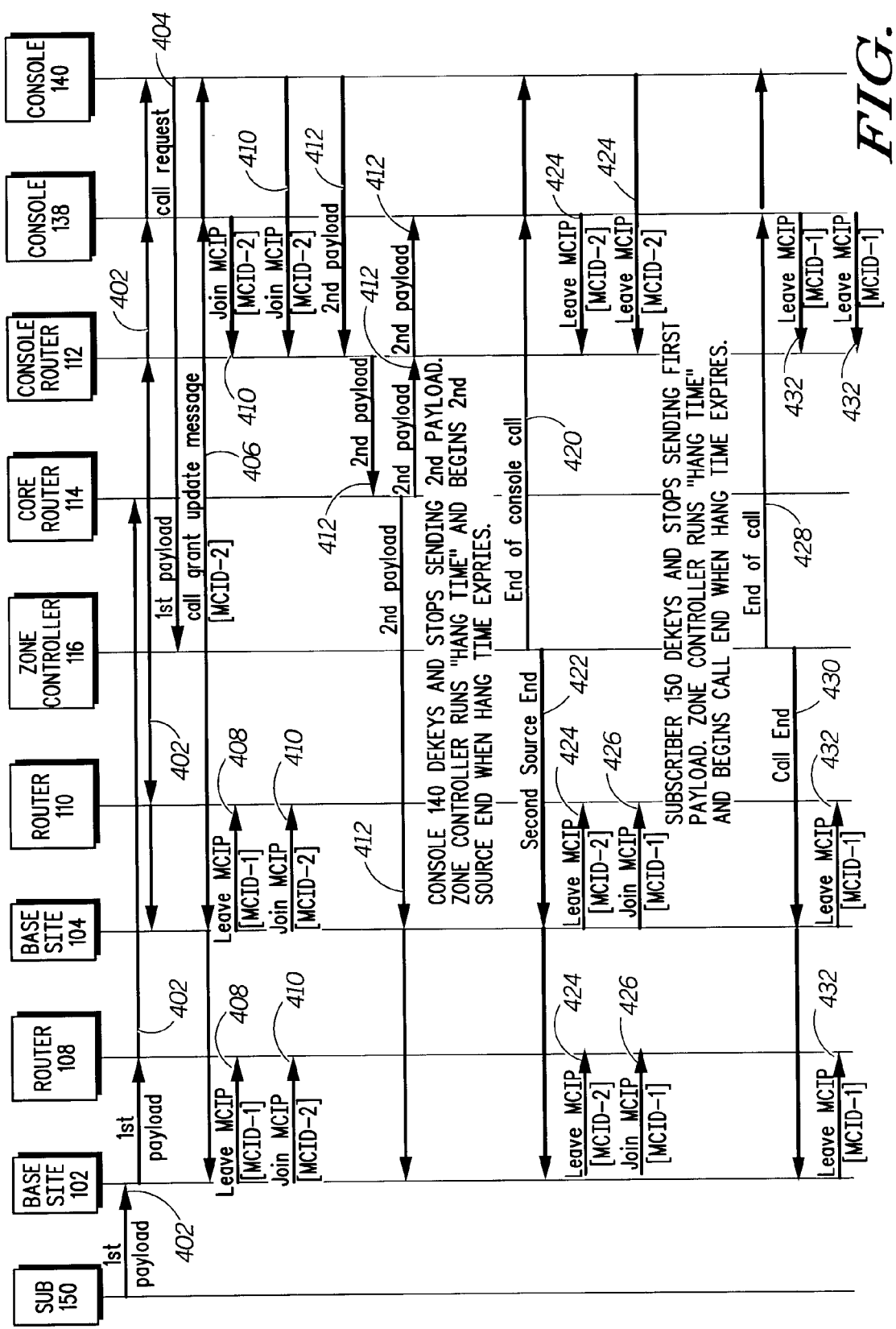
FIG. 4 is a message sequence chart associated with a console takeover of an active call sourced by a subscriber unit, when the console dekeys before the subscriber, according to one embodiment of the invention.

Message sequence charts associated with a console takeover of a subscriber initiated talkgroup call are shown at FIG. 3 and FIG. 4. In the examples of FIG. 3 and FIG. 4, the devices participating in the call are those of talkgroup "A" shown in FIG. 1. The active call comprises subscriber unit 150 transmitting a first payload 302 (402) to its associated base site 102. The payload 302 (402) is addressed to a first multicast group address, MCID-1, and sent from base site 102 via its associated router 108 and core router 114 to participating devices in talkgroup "A." The participating devices include base sites 102, 104 ("the first group") and consoles 138, 140 ("the second group"). Base site 102 is associated with subscriber unit 150 and base site 104 is associated with subscriber units 152, 154. While the call is in progress, console 140 sends a Call Request 304 (404) to Zone Controller 116.

Upon receiving the Call Request, the zone controller 116 identifies at step 206 a second payload multicast group address (e.g., MCID-2) that is to be used for distributing a payload ("second payload") from the console 140, during the active call, to one or more participating devices for the call. The second payload may comprise, for example, audio (including but not limited to voice), video, data, multimedia, etc. In a preferred embodiment, the second payload multicast group address is identified dynamically for each call request and is included in call grant update messages sent to the various talkgroup members participating in that call. For example, in FIG. 3 and FIG. 4, the second payload multicast group address is included in respective Call Grant Update Messages 306 (406) sent to the various participating devices.

At step 208, a first group of the participating devices leaves the first payload multicast group address ("first address"). In the example of FIG. 3 and FIG. 4, this comprises the repeater sites 102, 104 sending IGMP "Leave" messages 308 (408) to their respective routers 108, 110 to signify their desire to leave the first address, MCID-1. Upon receiving the "Leave" messages, the routers 108, 110, 114 disassemble a spanning tree of router interfaces between the first communication device (e.g., subscriber unit 150) and the first group of participating devices (e.g., repeater sites 102, 104), such that the repeater sites 102, 104 discontinue receiving the first payload from the subscriber unit 150. The second group of participating devices (e.g., consoles 138, 140), having never left the first address, continue to receive the first payload from the subscriber unit 150 at step 212.

Next, at step 210, the first and second groups of participating devices join the second payload multicast group address ("second address"). In the example of FIG. 3 and FIG. 4, the repeater sites 102, 104 send IGMP "Join" messages 310 (410) to their respective routers 108, 110, and the consoles 138, 140 send IGMP "Join" messages 310 (410) to their associated router 112 to join the second address, MCID-2. Upon receiving the "Join" messages, the routers 108, 110, 114 form a spanning tree of router interfaces between the second communication device (e.g., console 140) and the first and second groups of participating devices (e.g., repeater sites 102, 104 and consoles 138, 140) having joined the second address. Once the router interfaces are established, the second payload is distributed at step 214 to the first and second groups of participating devices. In the example of FIG. 3 and FIG. 4, console 140 sources the second payload 312 (412) and sends it to router 112. Router 112 sends the second payload to core router 114, which distributes the second payload to base sites 102, 104 and console 138.

Hence, at this point, in the example of FIG. 3 and FIG. 4, all of the monitoring console positions ("the second group") are able to hear both the subscriber 150 and the console 140. On the other hand, the repeater sites 102, 104 ("the first group") that were previously receiving payload from the subscriber 150 now receive payload only from the console 140. In that sense the console 140 has "taken over" the call from the subscriber 150. One reason for the base sites receiving payload only from the console 140, rather than both the console 140 and subscriber 150, is to conserve bandwidth on the site links. Conversely, the consoles receive payload from both sources because they are typically provisioned with sufficient bandwidth to accommodate both sources.

Figure 2B:
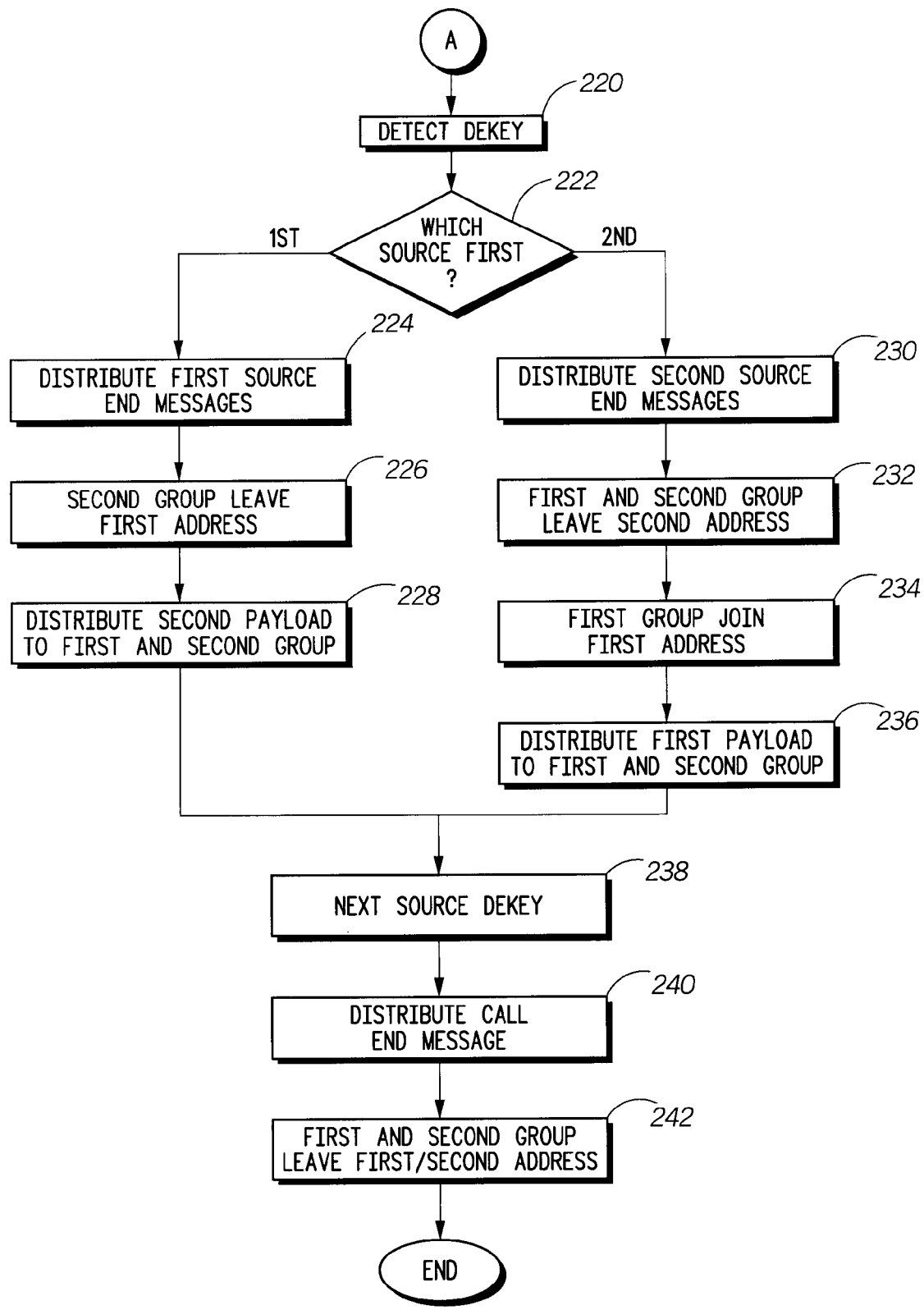
FIG. 2B is a flowchart illustrating the effects of different dekeying sequences among competing communication devices after takeover of an active call according to one embodiment of the invention.

Now referring to FIG. 2B, there is shown the effects of different dekeying sequences among the first and second communication devices. At step 220, the zone controller 116 receives a dekeying message from one of the communication devices. The zone controller determines which device has dekeyed first at step 222. Depending on which of the two sources is the first to dekey, one of two alternative courses is taken. Message sequence charts associated with different dekeying sequences between console 140 and subscriber 150, after console 140 has "taken over" the call, are shown in FIG. 3 and FIG. 4, respectively. FIG. 3 shows the example of subscriber 150 dekeying before console 140, whereas FIG. 4 shows the example of console 140 dekeying before subscriber unit 150.

At step 224, if the first device (e.g., subscriber unit 150) is first to dekey, the zone controller distributes messages to the participating devices indicating that the first communication device has dekeyed. In the example of FIG. 3, these messages comprise First Source End messages 322 to the sites 102, 104 and an End of Radio Call packet 320 to consoles 138, 140. Then, at step 226, the second group of participating devices leaves the first payload multicast group address. In FIG. 3, this comprises the consoles 138, 140 sending IGMP "Leave" messages 324 to router 112, causing the routers of the network to disassemble the spanning tree of router interfaces, thereby disabling communication with subscriber unit 150. The first group of participating devices (e.g., base sites 102, 104), having previously left the first address, remain disabled from communication with subscriber unit 150. The first and second groups of communication devices remain joined to the second address and continue to receive the second payload from the second device (e.g., console 140) at step 228.

At step 230, if the second device (e.g., console 140) is first to dekey, the zone controller distributes messages to the participating devices indicating that the second communication device has dekeyed. In the example of FIG. 4, these messages comprise Second Source End messages 422 to the sites 102, 104 and an End of Console Call packet 420 to consoles 138, 140. Then, at step 232, the first and second groups of participating devices leave the second payload multicast group address. In FIG. 4, the repeater sites 102, 104 send IGMP "Leave" messages 424 to their respective routers 108, 110, and the consoles 138, 140 send IGMP "Leave" messages 424 to their associated router 112 to leave the second address, MCID-2. Then, at step 234, the first group of the participating devices rejoin the first payload multicast group address. In FIG. 4, this comprises the repeater sites 102, 104 sending IGMP "Join" messages 426 to their respective routers 108, 110 to signify their desire to rejoin the first address, MCID-1. The routers of the network then reestablish the spanning tree of router interfaces enabling the repeater sites 102, 104 to again receive the first payload from the subscriber unit 150. The second group of participating devices (e.g., consoles 138, 140), having never left the first address, continue to receive the first payload from the subscriber unit 150. Thus, at step 236, both the first and second groups of participating devices receive the first payload from the subscriber unit 150.

At step 238, the zone controller 116 receives a dekeying message from the remaining communication device, thereby indicating an end of the call. After a "hang time" has expired, the zone controller distributes call end messages at step 240. The first and second groups leave the first or second address, as appropriate, at step 242. For example, in FIG. 3, when the console 140 dekeys, the zone controller sends Call End messages 328 to the sites 102, 104 and an End of Console Call packet 326 to consoles 138, 140. The repeater sites 102, 104 send IGMP "Leave" messages 330 to their respective routers 108, 110, and the consoles 138, 140 send IGMP "Leave" messages 330 to their associated router 112 to leave the second address, MCID-2. In the example of FIG. 4, when the subscriber 150 dekeys, the zone controller sends Call End messages 430 to the sites 102 104 and an End of Radio Call packet 428 to consoles 138, 140. The repeater sites 102, 104 send IGMP "Leave" messages 432 to their respective routers 108, 110, and the consoles 138, 140 send IGMP "Leave" messages 432 to their associated router 112 to leave the first address, MCID-1.

Figure 5A:
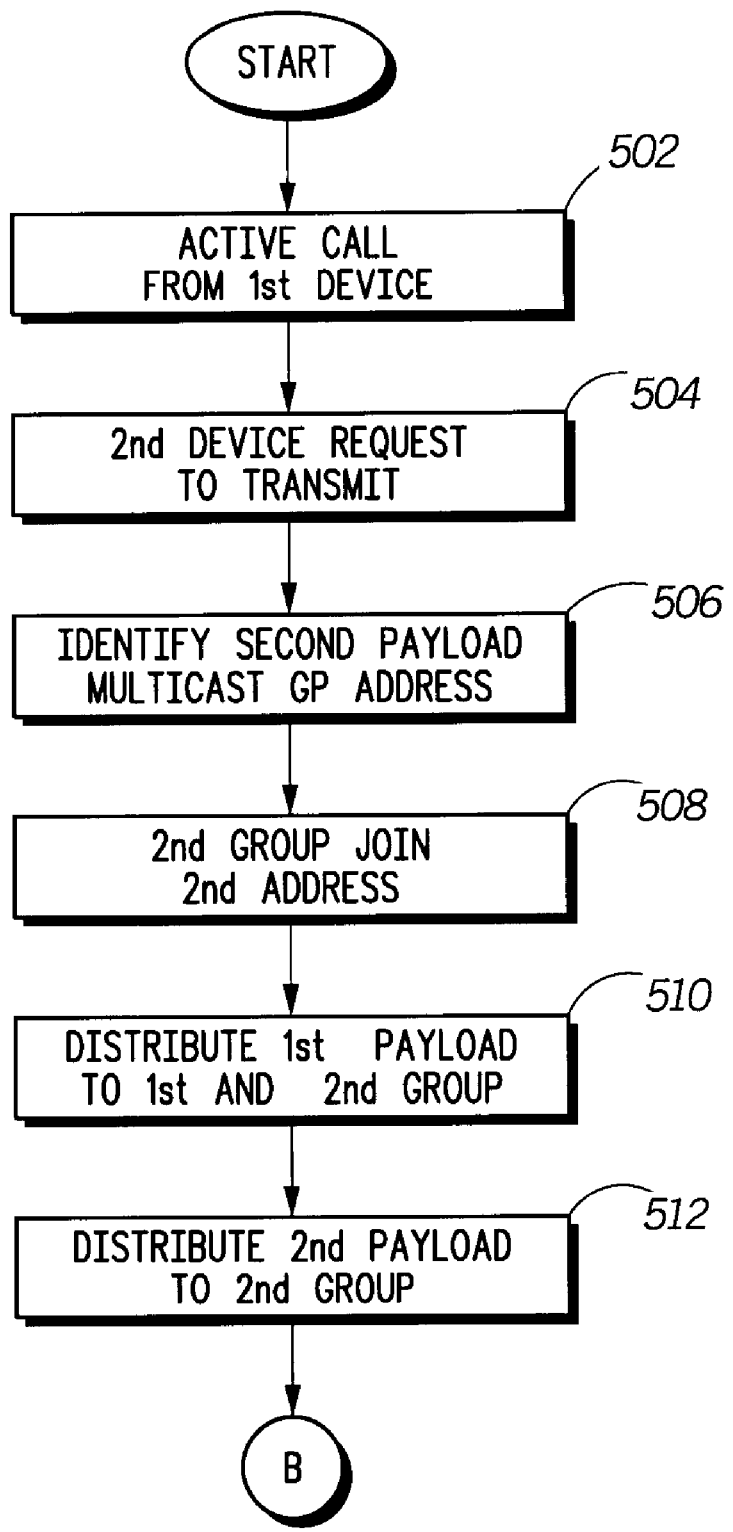
FIG. 5A is a flowchart illustrating a competing communication device being denied takeover of an active call according to one embodiment of the invention.

Now turning to FIG. 5A, there is shown a method for accommodating a request from a second communication device to transmit during an active talkgroup call from a first communication device. The first and second communication devices may comprise, for example, portable wireless communication devices, mobile wireless communication devices, wireline communication devices, wireless consoles, wireline consoles, repeaters, site controllers, comparators, telephone interconnect devices or internet protocol telephony devices. The steps of FIG. 5A are implemented, where applicable, using stored software routines within the communication devices, zone controller 116 or routers forming the network 100. Generally, the steps of FIG. 5A assume that the second communication device has a lower transmit priority than the first communication device, such that the second device is "denied takeover" of the active call. Thus, in one embodiment of the present invention, the steps of FIG. 5A may be executed to deny a subscriber radio takeover of an active call that is being sourced from a console. Massage sequence charts associated with a subscriber radio being denied takeover of a console initiated talkgroup call are shown at FIG. 6 and FIG. 7.

At step 502, the active call is initiated by a first communication device (e.g., console 140) transmitting a payload ("first payload") to one or more network devices (e.g., routers). The payload is addressed to a first payload multicast group address. Various participating devices having affiliated with the talkgroup and joined the first multicast group address are eligible to receive the first payload from the one or more network devices. The participating devices may comprise, for example, subscriber unit(s), such as a wireless mobile or portable radios, wireline communication device(s), console(s) (wireless or wireline), repeater(s)/base station(s), site controller(s), comparator(s)/voter(s), scanner (s), site controller(s), telephone interconnect device(s) or internet protocol telephony device(s). Similar to the method for "takeover" of an active call described in relation to FIG. 2A, the participating devices may be divided into a first and second group of communication devices having joined the first payload multicast group address at step 502. The participating devices may be divided, for example, in terms of the types of devices (e.g., consoles vs. repeaters) and/or the communication capability of the devices (e.g., full duplex vs. half duplex devices). Alternatively, the two groups may be divided arbitrarily or otherwise on some basis other than the type of device(s) or communication capability of the device(s). Moreover, either or both of the first and second groups may consist of a null set (e.g., no communication devices) or the entire set of communication devices participating in the active call.

Figure 6:
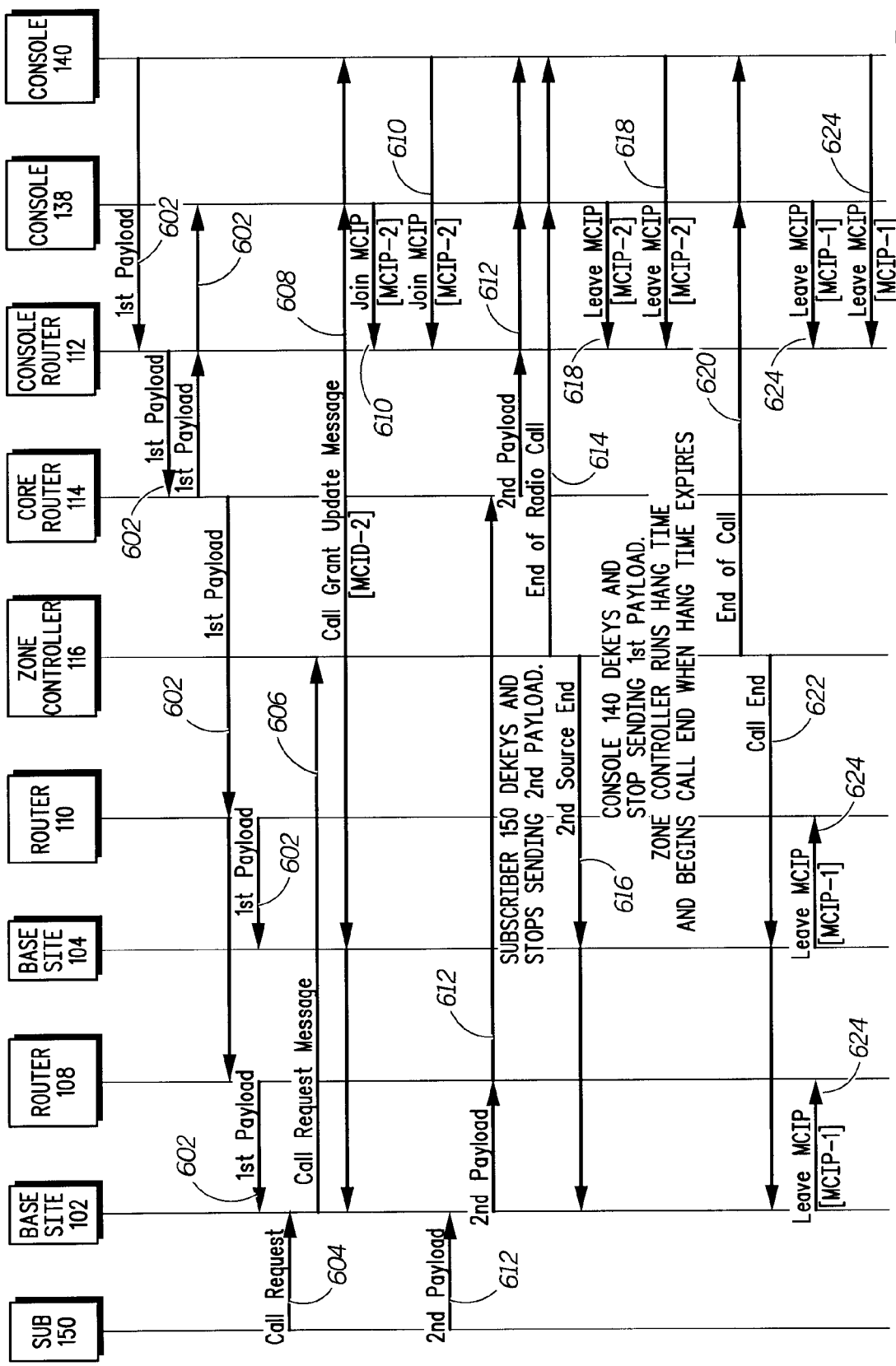
FIG. 6 is a message sequence chart associated with a subscriber unit being denied takeover of an active call sourced by a console, when the subscriber dekeys before the console, according to one embodiment of the present invention.
Figure 7:
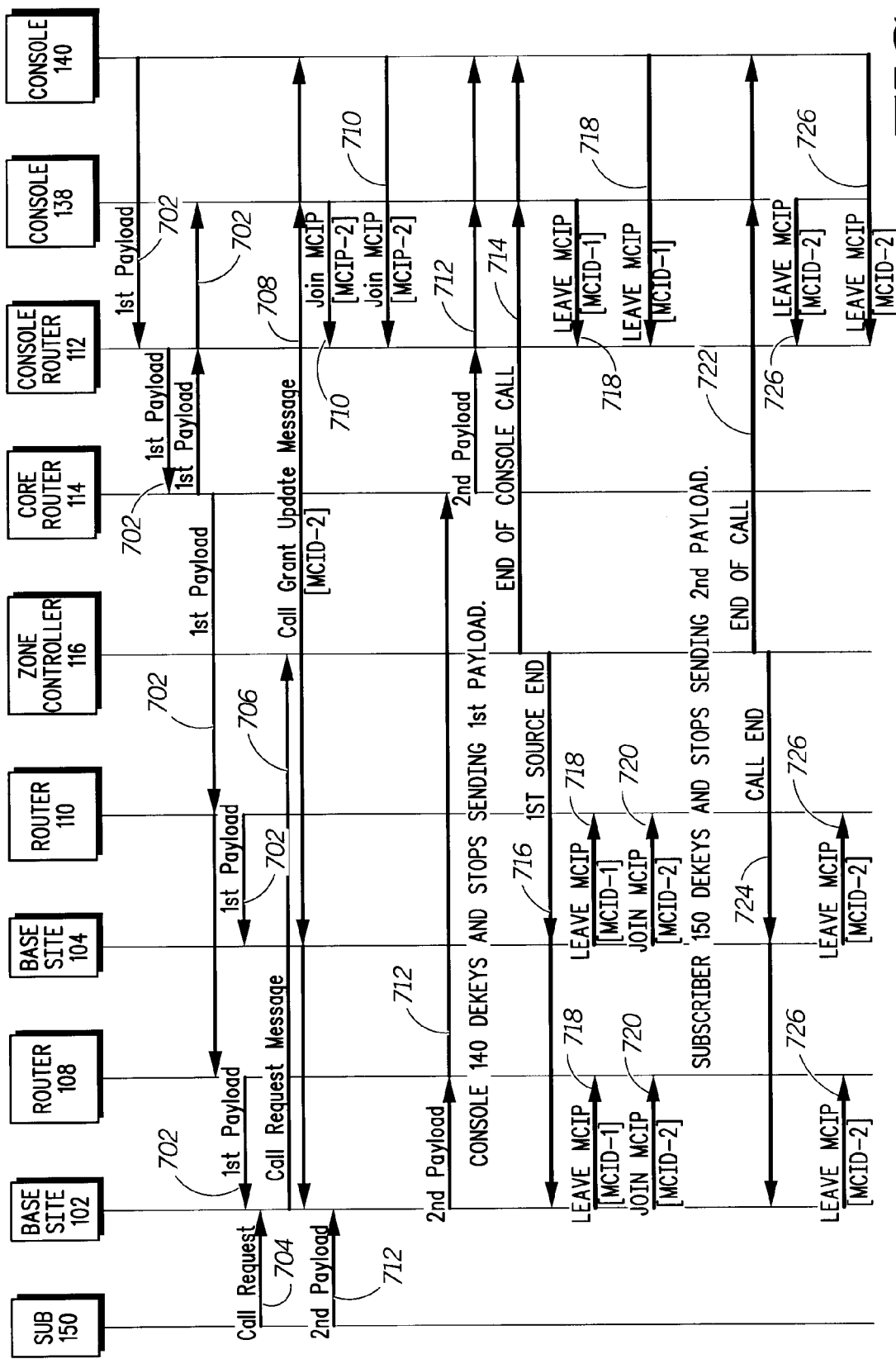
FIG. 7 is a message sequence chart associated with a subscriber unit being denied takeover of an active call sourced by a console, when the console dekeys before the subscriber, according to one embodiment of the present invention.

In the examples of FIG. 6 and FIG. 7, the devices participating in the call are those of talkgroup "A" shown in FIG. 1. The active call comprises console 140 transmitting a first payload 602 (702) to its associated router 112. The payload 602 (702) is addressed to a first multicast group address, MCID-1, and sent via router 112 and core router 114 to participating devices in talkgroup "A." The participating devices include base sites 102, 104 ("the first group") and consoles 138, 140 ("the second group"). Base site 102 is associated with subscriber unit 150 and base site 104 is associated with subscriber units 152, 154.

At step 504, the second communication device requests to transmit during the active call. In the example of FIG. 6 and FIG. 7, this comprises subscriber unit 150 sending a Call Request 604 to its associated base site 102, which in turn sends a Call Request Message 606 to the Zone Controller 116. Upon receiving the Call Request, the zone controller 116 identifies at step 506 a second payload multicast group address (e.g., MCID-2) that is to be used for distributing a payload ("second payload") from the subscriber 150, during the active call, to one or more participating devices for the call. The second payload may comprise, for example, audio (including but not limited to voice), video, data, multimedia, etc. In a preferred embodiment, the second payload multicast group address is identified dynamically for each call request and is included in call grant update messages sent to the various talkgroup members participating in that call. For example, in FIG. 6 and FIG. 7, the second payload multicast group address is included in respective Call Grant Update Messages 608 (708) sent to the various participating devices.

At step 508, the second group of the participating devices joins the second payload multicast group address ("second address"). In the example of FIG. 6 and FIG. 7, this comprises consoles 138, 140 sending IGMP "Join" messages 610 (710) to their associated router 112 to join the second address, MCID-2. Upon receiving the "Join" messages, the routers 108, 110, 114 form a spanning tree of router interfaces between the subscriber 150 and the second group of participating devices (e.g., consoles 138, 140) having joined the second address. Once the router interfaces are established, the second payload is distributed at step 512 to the second group of participating devices. In the example of FIG. 6 and FIG. 7, subscriber 150 transmits the second payload 612 (712) to its associated base site 102. The payload 612 (712) is addressed to a second multicast group address, MCID-2, and sent from base site 102 via its associated router 108 and core router 114 to the consoles 138, 140 having joined the second multicast group address.

Both the first group of communication devices (e.g., sites 102, 104) and the second group of participating devices (e.g., consoles 138, 140), having never left the first address, continue to receive the first payload from console 140 at step 510. Hence, at this point, in the example of FIG. 6 and FIG. 7, all of the monitoring console positions ("the second group") are able to hear both the subscriber 150 and the console 140. Moreover, the repeater sites 102, 104 ("the first group") that were receiving payload from console 140 before the transmission from the second source continue to receive payload only from the console 140. In that sense the call request from subscriber 150 is "denied takeover" of the call from the console 140.

Figure 5B:
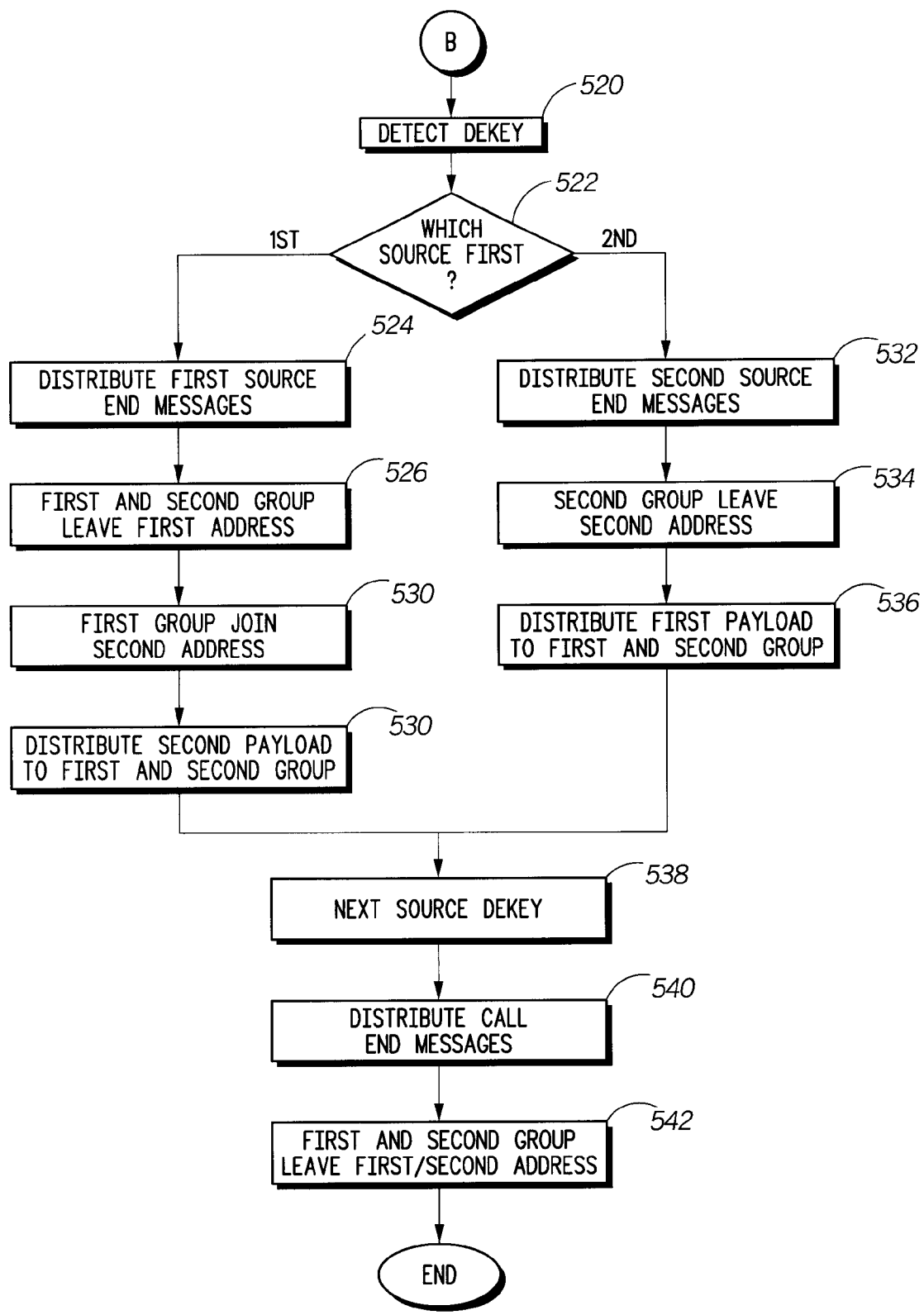
FIG. 5B is a flowchart illustrating the effects of different dekeying sequences among competing communication devices after a denied takeover of an active call according to one embodiment of the invention.

Now referring to FIG. 5B, there is shown the effects of different dekeying sequences among the first and second communication devices, after having denied takeover of the call by the second device. At step 520, the zone controller 116 receives a dekeying message from one of the communication devices. The zone controller determines which device has dekeyed first at step 522. Depending on which of the two sources is the first to dekey, one of two alternative courses is taken. Message sequence charts associated with different dekeying sequences between console 140 and subscriber 150, after subscriber 150 has been "denied takeover" of the call, are shown in FIG. 6 and FIG. 7. FIG. 6 shows the example of subscriber 150 dekeying before console 140, whereas FIG. 7 shows the example of console 140 dekeying before subscriber unit 150.

At step 524, if the first device (e.g., console 140) is first to dekey, the zone controller distributes messages to the participating devices indicating that the first communication device has dekeyed. In the example of FIG. 7, these messages comprise First Source End messages 716 to the sites 102, 104 and an End of Console Call packet 714 to consoles 138, 140. Then, at step 526, the first and second groups of participating devices leave the first payload multicast group address. In FIG. 7, the repeater sites 102, 104 send IGMP "Leave" messages 718 to their respective routers 108, 110, and the consoles 138, 140 send IGMP "Leave" messages 718 to their associated router 112 to leave the first address, MCID-1. Next, at step 528, the first group of the participating devices join the second payload multicast group address. In FIG. 7, this comprises the repeater sites 102, 104 sending IGMP "Join" messages 720 to their respective routers 108, 110 to signify their desire to join the second address, MCID-2. The routers of the network then establish the spanning tree of router interfaces enabling the repeater sites 102, 104 to receive the second payload from the subscriber unit 150. The second group of participating devices (e.g., consoles 138, 140), having never left the second address, continue to receive the second payload from the subscriber unit 150. Thus, at step 530, both the first and second groups of participating devices receive the second payload from the subscriber unit 150.

At step 532, if the second device (e.g., subscriber 150) is first to dekey, the zone controller distributes messages to the participating devices indicating that the second communication device has dekeyed. In the example of FIG. 6, these messages comprise Second Source End messages 616 to the sites 102, 104 and an End of Radio Call packet 614 to consoles 138, 140. Then, at step 534, the second group of participating devices leaves the second payload multicast group address. In FIG. 6, this comprises the consoles 138, 140 sending IGMP "Leave" messages 618 to router 112, causing the routers of the network to disassemble the spanning tree of router interfaces, thereby disabling communication with subscriber unit 150. The first group of participating devices (e.g., base sites 102, 104), having never joined the second address, remain disabled from communication with subscriber unit 150. The first and second groups of communication devices remain joined to the first address and continue to receive the first payload from the first device (e.g., console 140) at step 536.

At step 538, the zone controller 116 receives a dekeying message from the remaining communication device, thereby indicating an end of the call. After a "hang time" has expired, the zone controller distributes call end messages at step 540. The first and second groups leave the first or second address, as appropriate, at step 542. For example, in FIG. 6, when the console 140 dekeys, the zone controller sends Call End messages 622 to the sites 102, 104 and an End of Console Call packet 620 to consoles 138, 140. The repeater sites 102, 104 send IGMP "Leave" messages 624 to their respective routers 108, 110, and the consoles 138, 140 send IGMP "Leave" messages 624 to their associated router 112 to leave the first address, MCID-1. In the example of FIG. 7, when the subscriber 150 dekeys, the zone controller sends Call End messages 724 to the sites 102, 104 and an End of Radio Call packet 722 to consoles 138, 140. The repeater sites 102, 104 send IGMP "Leave" messages 726 to their respective routers 108, 110, and the consoles 138, 140 send IGMP "Leave" messages 726 to their associated router 112 to leave the second address, MCID-2.

Figure 8:
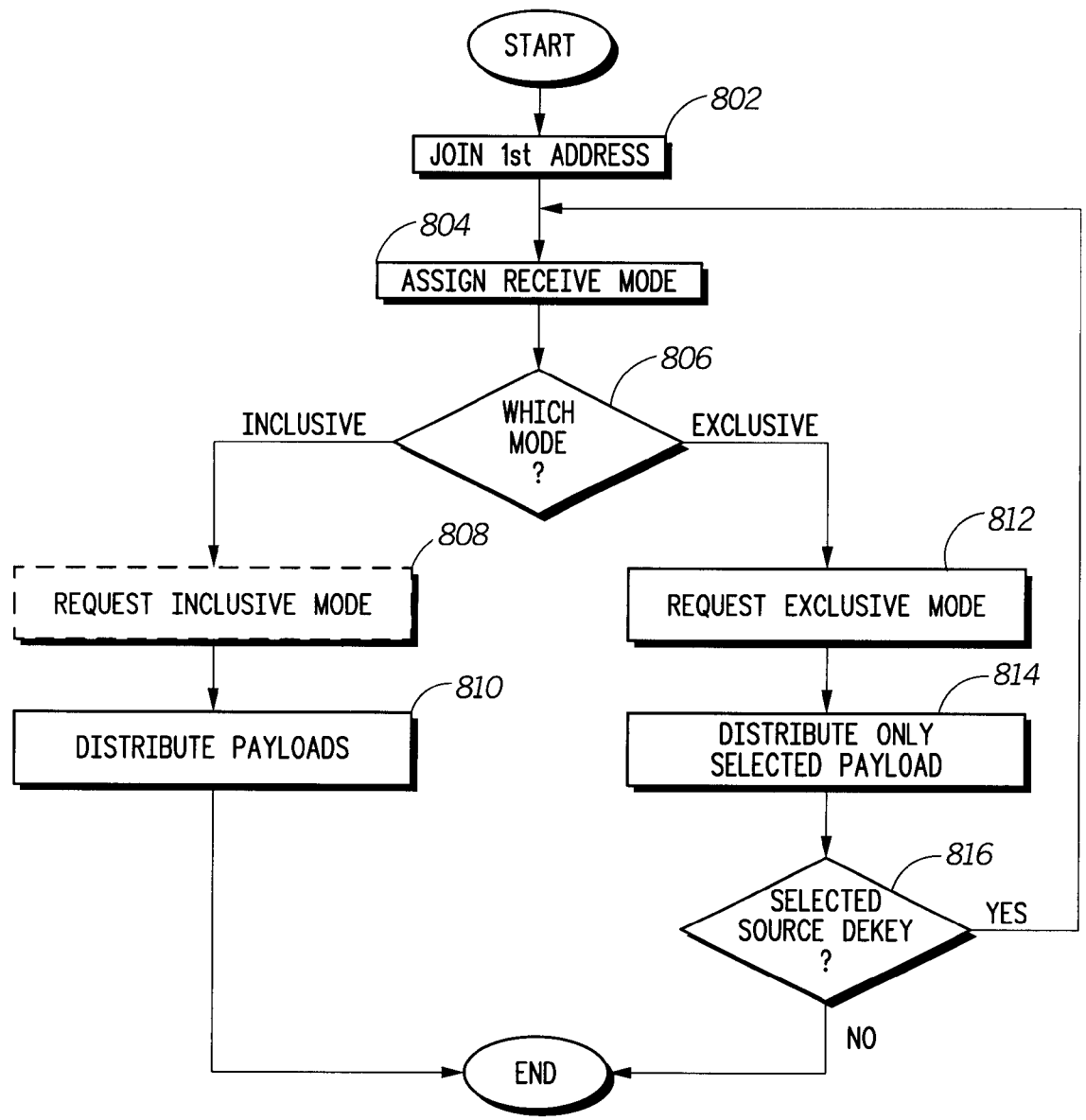
FIG. 8 is a flowchart illustrating the assignment of different receive modes to different communication devices according to one embodiment of the invention.

Now turning to FIG. 8, there is shown a flowchart illustrating a method for assigning different receive modes to different groups of communication devices according to one embodiment of the invention. The method may be practiced in an IP multicast communication system of the type shown in FIG. 1, or in multi-zone systems. Generally, the method provides a manner of distributing payload to different endpoints of a talkgroup without using two multicast groups. At step 802, participating communication devices in a talkgroup join a first payload multicast group address. The first multicast group address may be the destination address of multiple payloads from multiple sources. For example, with reference to FIG. 1, consoles 138, 140 and base sites 102, 104 join a first payload multicast group address, which may comprise the destination address for payloads simultaneously sourced from subscriber unit 150 and console 140.

At step 804, the zone controller 116 assigns group(s) of communication devices having joined the first payload multicast group address to either an exclusive or inclusive receive mode. In one embodiment, this comprises the zone controller 116 identifying which ones, if any, of the communication devices that should enter an exclusive receive mode and which one of the first and second payloads that is to be received by those devices in the exclusive receive mode. The zone controller sends a unicast message to any such devices, instructing them to enter the exclusive receive mode and identifying which one of the first and second payloads is to be received in the exclusive receive mode. For example, in the situation where subscriber unit 150 and console 140 are simultaneously transmitting payloads, the zone controller may determine that participating base sites are to operate in exclusive receive mode and receive payload only from console 140. Accordingly, the zone controller sends a unicast message to the base sites indicating that they should listen only to IP message traffic from the console 140.

In one embodiment, any participating devices having joined the first payload multicast group address and not receiving an instruction from the zone controller to enter the exclusive mode will operate by default in an inclusive (or "normal") mode in which they will receive all payload(s) sent to the first payload multicast group address. For example, in the situation where subscriber unit 150 and console 140 are simultaneously transmitting payloads, the zone controller will generally not instruct consoles 138, 140 to operate in the exclusive receive mode, thus the consoles will operate in the inclusive mode to receive payload both from subscriber unit 150 and console 140. Alternatively, the zone controller at step 804 may send message(s) to the appropriate participating devices (e.g., consoles 138, 140) instructing them to enter the inclusive mode.

At step 806, it is determined which devices are operating in the inclusive or exclusive receive mode. In one embodiment, as heretofore described, those devices having been instructed by the zone controller to operate in exclusive receive mode will so operate, whereas all other devices operate in the normal mode. Alternatively, the devices themselves might independently select the exclusive or inclusive receive mode, as appropriate. Optionally, at step 808, those devices (e.g., consoles) that are to operate in the inclusive mode send messages to one or more network devices requesting to receive all of the payload(s) addressed to the first multicast group address. At step 810, those payload(s) are distributed to the devices operating in the exclusive mode. For example, in the situation where subscriber unit 150 and console 140 are simultaneously transmitting payloads, those devices operating in the normal mode will receive payloads from both subscriber unit 150 and console 140. Alternatively, the devices operating in the inclusive mode will receive all of the payloads by default, without sending a request message at step 808.

At step 812, those devices (e.g., repeaters) that are to operate in the exclusive mode send messages to one or more network devices requesting to receive only the selected one of the first and second payloads. For example, where the repeater sites 102, 104 (FIG. 1) are to operate in the exclusive mode, they send messages to their respective routers 108, 110 to signify their desire to receive only the selected payload (e.g., from console 140). In one embodiment, the message comprises an IGMPv3 message having an exclusivity filter address set to the address of console 140. Upon receiving the messages, the routers of the network operate to "filter" the non-selected source (e.g., subscriber unit 150) payload so that it is not passed to the repeater sites. At step 814, payload(s) are distributed, via the routers, from any source(s) that have not been filtered. Thus, in the present example, payload is distributed only from console 140 to the repeater sites 102, 104.

At step 816, if the selected source dekeys, it is detected by the zone controller 116 and the process returns to step 804 to possibly re-assign the mode of operation of the devices in the exclusive mode. For example, consider a repeater that is operating in the exclusive mode to receive payload only from console 140, during a period when both the console 140 and subscriber unit 150 are sourcing payload. When the console 140 dekeys, the zone controller in one embodiment sends a message to the repeaters, instructing them to revert back to the normal mode of operation (i.e., cancel the exclusivity filter). In such case, the repeaters at step 808 send messages to the appropriate routers requesting to remove the exclusivity filter. Then, at step 810, payload from the (initially) nonselected source (e.g., subscriber 150) is distributed to the repeaters.

The present disclosure therefore has identified various methods for implementing talkgroup calls in an IP multicast network among competing sources. The disclosure has identified methods for console dispatch takeover of an active call from a subscriber, for accommodating a call from a subscriber unit ("attempted takeover") of an active call from a console, and for assigning different receive modes to different groups of communication devices. The methods allow for monitoring dispatch consoles to hear both the subscriber and the transmitting console. The method preserves base site functionality by allowing dispatch console audio to reach the base site repeaters, while at the same time preventing lower priority audio from transversing the base sites to conserve base site link bandwidth. The present disclosure has further identified sequences of messages that are invoked by repeaters and dispatch consoles, for a console takeover condition and subscriber denied takeover condition, when the subscriber dekeys before the console and when the console dekeys before the subscriber.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system including a plurality of communication devices participating in an active talkgroup call, the active talkgroup call defining a first payload transmitted from a first communication device to one or more network devices and addressed to a first payload multicast group address, the communication devices having joined the first payload multicast group address to receive the first payload from the one or more network devices, a method comprising:

receiving, from a second communication device, a request to transmit during the active talkgroup call;

identifying a second payload multicast group address to be used for distributing payload from the second communication device during the active talkgroup call, the payload from the second communication device defining a second payload;

leaving, by a first group of the communication devices, the first payload multicast group address;

joining, by the first group of the communication devices and a second group of communication devices, the second payload multicast group address;

sending, from the second communication device to the one or more network devices, the second payload addressed to the second payload multicast group address; and sending the second payload from the one or more network devices to the first and second group of communication devices joined to the second payload multicast group address.

2. The method of claim 1, wherein the first and second payloads are selected from the group consisting of an audio payload, a data payload, a video payload, and a multimedia payload.

3. The method of claim 1, wherein the communication devices participating in the active talkgroup call are selected from the group consisting of a portable wireless communication device, mobile wireless communication device, wireline communication device, wireless console, wireline console, repeater, site controller, comparator, telephone interconnect device, internet protocol telephony device, call logger, scanner and gateway.

4. The method of claim 1, wherein the first and second communication devices are selected from the group consisting of a portable wireless communication device, mobile wireless communication device, wireline communication device, wireless console, wireline console, repeater, site controller, comparator, telephone interconnect device and internet protocol telephony device.

5. The method of claim 1, wherein the first communication device has a lower transmit priority than the second communication device.

6. The method of claim 5, wherein the first communication device comprises a subscriber unit and the second communication device comprises a console.

7. The method of claim 1, wherein the first group of communication devices comprises one or more repeaters and the second group of communication devices comprises one or more consoles.

8. The method of claim 1, wherein the first communication device dekeys before the second communication device, the method comprising:

determining, by a controller, that the first communication device has dekeyed;

sending, by the controller to the second group of communication devices, respective messages indicating that the first communication device has dekeyed; and leaving, by the second group of communication devices, the first payload multicast group address, the first and second group of communication devices remaining joined to the second payload multicast group address to receive the second payload from the second communication device.

9. The method of claim 8 further comprising the steps of:

determining, by a controller, that the second communication device has dekeyed;

sending, by the controller to the first and second group of communication devices joined to the second payload multicast group address, respective messages indicating that the second communication device has dekeyed; and leaving, by the first and second group of communication devices, the second payload multicast group address.

10. The method of claim 1, wherein the second communication device dekeys before the first communication device, the method comprising:

determining, by a controller, that the second communication device has dekeyed;

sending, by the controller to the first and second group of communication devices joined to the second payload multicast group address, respective messages indicating that the second communication device has dekeyed;

leaving, by the first and second group of communication devices, the second payload multicast group address;

joining, by the first group of communication devices, the first payload multicast group address, the first and second group of communication devices thereby being joined to the first payload multicast group address to receive the first payload from the first communication device.

11. The method of claim 10 further comprising the steps of:

determining, by a controller, that the first communication device has dekeyed;

sending, by the controller to the first and second group of communication devices joined to the first payload multicast group address, respective messages indicating that the first communication device has dekeyed; and leaving, by the first and second group of communication devices, the first payload multicast group address.

12. In a communication system including a plurality of communication devices participating in an active talkgroup call, the active talkgroup call defining a first payload transmitted from a first communication device to one or more network devices and addressed to a first payload multicast group address, a method comprising:

joining, by a first and second group of the communication devices, the first payload multicast group address;

receiving, from a second communication device, a request to transmit during the active talkgroup call;

identifying a second payload multicast group address to be used for distributing payload from the second communication device during the active talkgroup call, the payload from the second communication device defining a second payload;

joining, by the second group of communication devices, the second payload multicast group address sending, from the second communication device to the one or more network devices, the second payload addressed to the second payload multicast group address; and sending the second payload from the one or more network devices to the second group of communication devices joined to the second payload multicast group address.

13. The method of claim 12, wherein the communication devices participating in the active talkgroup call are selected from the group consisting of a portable wireless communication device, mobile wireless communication device, wireline communication device, wireless console, wireline console, repeater, site controller, comparator, telephone interconnect device, internet protocol telephony device, call logger, scanner and gateway.

14. The method of claim 12, wherein the first and second communication devices are selected from the group consisting of a portable wireless communication device, mobile wireless communication device, wireline communication device, wireless console, wireline console, repeater, site controller, comparator, telephone interconnect device and internet protocol telephony device.

15. The method of claim 12, wherein the first communication device has a higher transmit priority than the second communication device.

16. The method of claim 12, wherein the first communication device comprises a console and the second communication device comprises a subscriber unit.

17. The method of claim 12, wherein the first group of communication devices comprises one or more repeaters and the second group of communication devices comprises one or more consoles.

18. The method of claim 12, wherein the second communication device dekeys before the first communication device, the method comprising:

determining, by a controller, that the second communication device has dekeyed;

sending, by the controller to the second group of communication devices joined to the second payload multicast group address, respective messages indicating that the second communication device has dekeyed; and leaving, by the second group of communication devices, the second payload multicast group address, the first and second group of communication devices remaining joined to the first payload multicast group address to receive the first payload from the first communication device.

19. The method of claim 18 further comprising the steps of:

determining, by a controller, that the first communication device has dekeyed;

sending, by the controller to the first and second group of communication devices joined to the first payload multicast group address, respective messages indicating that the first communication device has dekeyed; and leaving, by the first and second group of communication devices, the first payload multicast group address.

20. The method of claim 12, wherein the first communication device dekeys before the second communication device, the method comprising:

determining, by a controller, that the first communication device has dekeyed;

sending, by the controller to the first and second group of communication devices joined to the first payload multicast group address, respective messages indicating that the first communication device has dekeyed;

leaving, by the first and second group of communication devices, the first payload multicast group address;

joining, by the first group of communication devices, the second payload multicast group address, the first and second group of communication devices thereby being joined to the second payload multicast group address to receive the second payload from the second communication device.

21. The method of claim 20 further comprising the steps of:

determining, by a controller, that the second communication device has dekeyed;

sending, by the controller to the first and second group of communication devices joined to the second payload multicast group address, respective messages indicating that the second communication device has dekeyed; and leaving, by the first and second group of communication devices, the second payload multicast group address.

22. A method comprising the steps of:

simultaneously sending multiple payloads to one or more network devices from multiple sources, the multiple payloads being addressed to a first payload multicast group address;

assigning, by a controller, a communication device having joined the first payload multicast group address to enter an exclusive receive mode;

sending, from the communication device to the one or more network devices, respective messages requesting operation in the exclusive receive mode; and sending, from the one or more network devices to the communication device having requested operation in the exclusive receive mode, only a selected one of the multiple payloads.

23. The method of claim 22, wherein the step of assigning comprises:

identifying, by the controller, the selected one of the multiple payloads that is to be received in the exclusive receive mode;

sending, from a controller to the communication device, a message instructing the communication device to enter the exclusive receive mode, the message identifying the selected one of the multiple payloads that is to be received in the exclusive receive mode.

24. The method of claim 23, further comprising the steps of:

sending, from the controller to the communication device, a message indicating that a communication device associated with the selected one of the multiple payloads has dekeyed;

sending, from the communication device to the one or more network devices, respective messages requesting to discontinue operation in the exclusive receive mode; and sending, from the one or more network devices to the communication device having requested to discontinue operation in the exclusive receive mode, a remaining one or more of the multiple payloads.

* * * * *